United States Patent [19]
Fohn et al.

[11] Patent Number: 6,076,091
[45] Date of Patent: Jun. 13, 2000

[54] METHOD AND SYSTEM FOR PROVIDING A FLEXIBLE AND EXTENSIBLE DATABASE INTERACTIVE ON-LINE ELECTRONIC CATALOG

[75] Inventors: Steffen Michael Fohn, Raleigh, N.C.; Arthur Reginald Greef, Seattle, Wash.; John Frederick Schumacher, White Plains, N.Y.

[73] Assignee: International Business Machines Corporation, Armonk, N.Y.

[21] Appl. No.: 08/987,214

[22] Filed: Dec. 9, 1997

Related U.S. Application Data

[60] Provisional application No. 60/032,543, Dec. 10, 1996.

[51] Int. Cl.[7] .................................................. G06F 17/30
[52] U.S. Cl. .......................... 707/102; 707/3; 707/103; 707/104
[58] Field of Search ................... 707/1, 2, 3, 4, 707/5, 9, 10, 100, 101, 102, 103, 104, 501, 513, 530, 531; 705/26, 28, 39; 348/7, 12

[56] References Cited

U.S. PATENT DOCUMENTS

| | | | |
|---|---|---|---|
| 4,992,940 | 2/1991 | Dworkin | 705/26 |
| 5,367,619 | 11/1994 | Dipaolo et al. | 707/506 |
| 5,603,025 | 2/1997 | Tabb et al. | 707/2 |
| 5,727,950 | 3/1998 | Cook et al. | 434/350 |
| 5,740,425 | 4/1998 | Povilus | 395/611 |
| 5,819,092 | 10/1998 | Ferguson et al. | 395/701 |
| 5,832,496 | 11/1998 | Anand et al. | 707/102 |

*Primary Examiner*—Wayne Amsbury
*Assistant Examiner*—Srirama Channavajjala
*Attorney, Agent, or Firm*—Steven J. Soucar; Anne Vachon Dougherty

[57] ABSTRACT

An on-line interactive catalog system having a plurality of catalog agent metaphors (CAM's), each comprising a set of components, portions of a knowledge representation and a design for the creation of components, facilitating the creation of different forms of interactions with an electronic catalog knowledge representation. The CAM's further provide a methodology in which rich knowledge representations about cataloged information can be created iteratively. The creation of the knowledge representation or information model for the electronic catalog is driven by a particular set of desired interactions, thereby providing a unique approach to the creation and dynamic maintenance of electronic catalogs, information models and user interfaces. The CAM system also provides a method for providing flexible catalogs, allowing for simple interaction metaphors having simple information and modeling requirements to be created and become operational without overwhelming design demands, while still providing for dynamic flexible growth and extensibility of the product knowledge representation and interaction approaches.

26 Claims, 11 Drawing Sheets

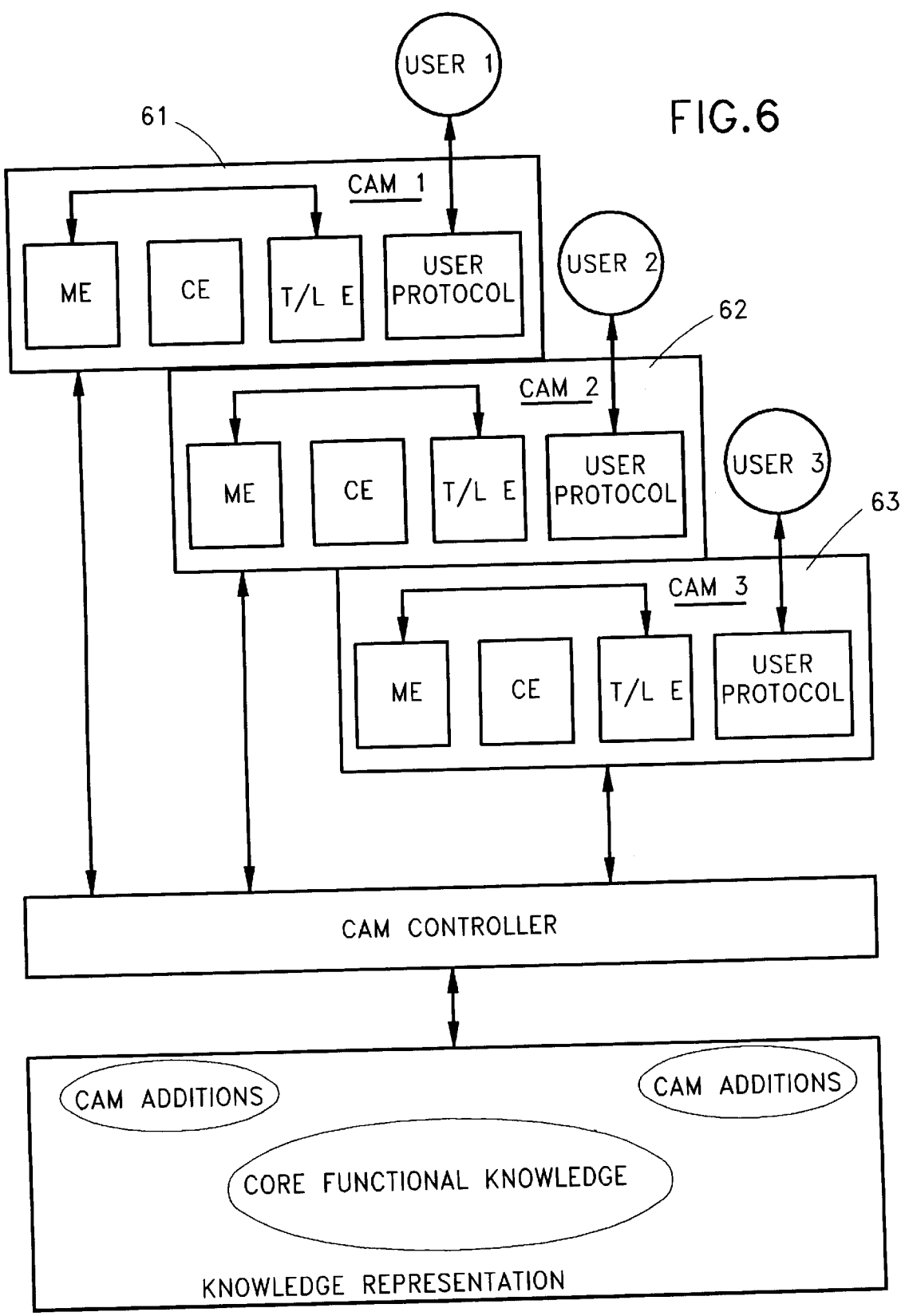

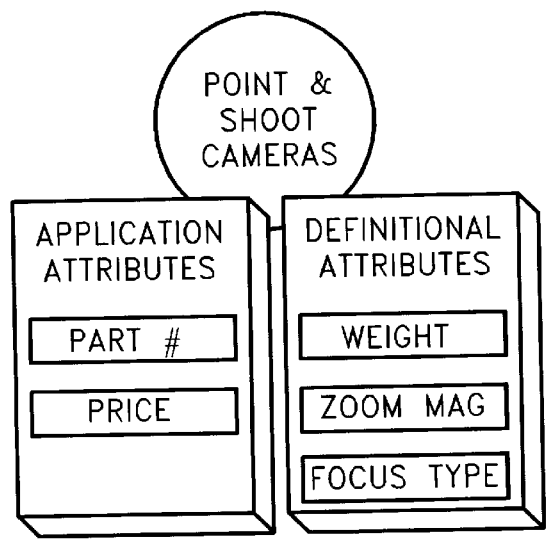
FIG.8
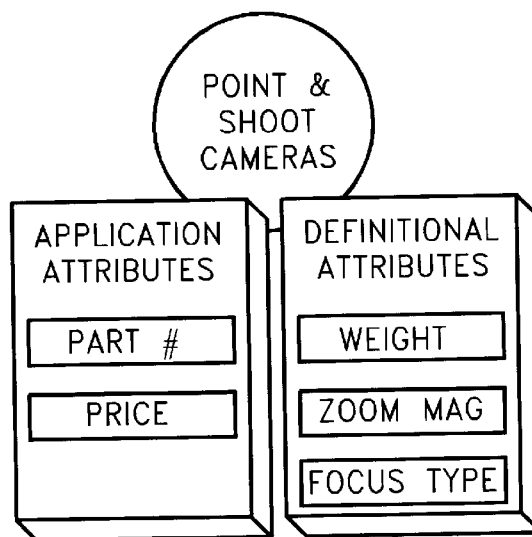
FIG.9
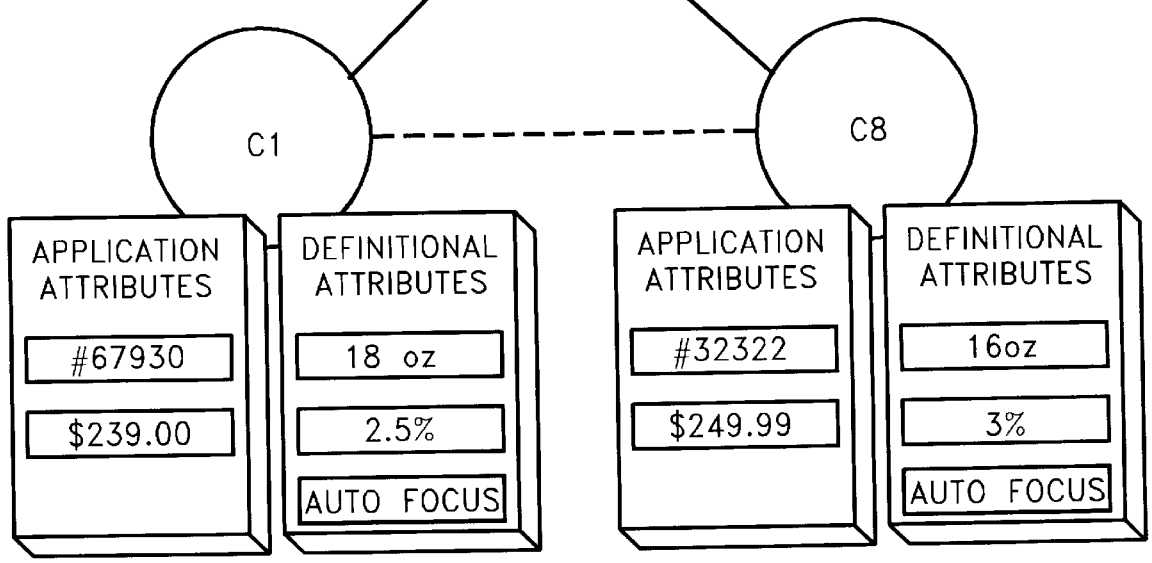

| FOCUS SYSTEM | AUTO | MANUAL | AUTO WITH MANUAL OVERIDE |
|---|---|---|---|
| ZOOM LENGTH | 2x | 2.5x | 3x |
| WEIGHT | 16oz | 18oz | 32oz |
| THERE ARE 28 PRODUCTS REMAINING WITH DESIRED PROPERTIES ||||

| FOCUS SYSTEM | AUTO | MANUAL | AUTO WITH MANUAL OVERIDE |
|---|---|---|---|
| ZOOM LENGTH | 3x | | |
| WEIGHT | 32oz | | |
| THERE ARE 3 PRODUCTS REMAINING WITH DESIRED PROPERTIES ||||

METHOD AND SYSTEM FOR PROVIDING A FLEXIBLE AND EXTENSIBLE DATABASE INTERACTIVE ON-LINE ELECTRONIC CATALOG

This application was filed as U.S. Provisional application No. 60/032,543 on Dec. 10, 1996.

FIELD OF THE INVENTION

This invention relates to the field of electronic information exploration. More specifically, it relates to internet-based electronic catalog query and response interactions for product inquiries and sales.

BACKGROUND OF THE INVENTION

Search tools for advancing through information provided in a database have been available for years. Generally, in such applications, a user's responses direct progress through the layers of available information. The interaction follows one of a plurality of pre-set paths along a decision tree, with the user input typically being limited to responses to pre-defined choices. So-called "expert systems," such as searchable on-line medical databases, are navigated via responses to system prompts regarding symptoms which are tied to various diagnoses in a relational database. Interactive on-line catalog sales applications utilize user responses to questions, which may directly or indirectly relate to products in the catalog. The user may indicate his or her interest in defined categories of product information and then be provided with appropriate screens displaying available product from the database. Such systems frequently attempt to direct the information retrieval by first gathering information about the user and the user's needs, before posing specific product questions, thereby establishing the appropriate path along the decision tree in advance.

Shortcomings of available prior art search and query tools include the fact that all users must interact with the system using a limited set of pre-established interactions. Necessarily the pre-established interactions are predisposed toward a particular type of customer and cannot effectively meet the needs of a larger audience of users that may have an interest in the information. In addition, all users must navigate through the pre-set paths and iterations even when the bulk of the information accessible via those paths would not be applicable to that user's needs or to the user's level of familiarity with the available information. The latter shortcoming is particularly significant when one considers provision of product information over the internet. With worldwide access, users from geographically diverse locations will have different requirements on available product sets when interacting with the same catalog. For example, users from North America who are shopping for clothing during December will wish to view a different product set than will users from South America who are shopping for clothing at the same time. In addition, the geographically separated users may well have different interaction communication needs, such as that each user may wish to communicate in his or her native language. Different users will also have different interaction parameters with respect to the level of product detail that they require. For example, when shopping for a camera, a professional photographer will approach the interaction with more detailed specification requirements than will a user who is shopping for a camera as a gift. Finally, the details of the actual display of product information should ideally differ depending upon the user, the user's needs, and the user's knowledge in the area. No currently available systems can accommodate any, let alone all, of the foregoing demands.

Additional drawbacks associated with available on-line interactive information retrieval systems result from the tight coupling of data and applications, mandating that the complex models for the information database (e.g., cross-referencing therein, etc.) must be fully developed before the system can be usable, and are frequently fixed once executed, such that periodic updates cannot be performed. One cannot, therefore, begin operating an on-line interactive catalog and expect to dynamically maintain and extend that catalog while it is in use.

In designing and maintaining an on-line interactive catalog system, today, one must realize that, in the future, robots and computer agents will be operating on the internet, along with human users. The ability to support computer agent interactions should therefore be a major objective of any entity which is providing an electronic catalog.

It is therefore an objective of the present invention to provide an on-line catalog to support diverse shopping needs, including those of multinational, multiple skill level human users as well as computer agent users.

It is another objective of the invention to provide an extensible system to allow system updates to the system's knowledge representation while the system is up and running.

Still another objective of the invention is to provide a system which allows seamless user transitions from one interaction approach to another.

Yet another objective of the invention is to provide a system which can dynamically create and maintain user persona and demographic information in order to present information tailored to the needs of the user.

SUMMARY OF THE INVENTION

These and other objectives are realized by the present inventive system having a plurality of catalog agent metaphors (CAMs), each comprising a set of components, portions of a knowledge representation and a design for the creation of components, which facilitates the creation of different forms of interactions with an electronic catalog knowledge representation. The CAMs further provide a methodology by which rich knowledge representations about products can be created iteratively. The creation of the knowledge representation or information model for the electronic catalog is driven by a particular set of desired interactions, thereby providing a unique approach to the creation and dynamic maintenance of electronic catalogs, information models and user interfaces. The CAM system also provides a method for providing flexible catalogs, allowing for simple interaction metaphors having simple information and modeling requirements to be created and become operational without overwhelming design demands, while still providing for dynamic flexible growth and extensibility of the product knowledge representation and interaction approaches, for interactions with human and non-human users.

BRIEF DESCRIPTION OF THE DRAWINGS

The invention will now be further detailed with specific reference to the appended Figures wherein:

FIG. 6 provides a schematic illustration of multiple CAM's interacting with the CAM Controller and, through the CAM Controller, with the knowledge representation.

FIG. 8 illustrates a representative knowledge model created with the Model Editor for "point and shoot" cameras.

FIG. 9 provides a resulting knowledge model created with the Content Editor for point and shoot cameras.

DESCRIPTION OF THE PREFERRED EMBODIMENT

Figure 1:
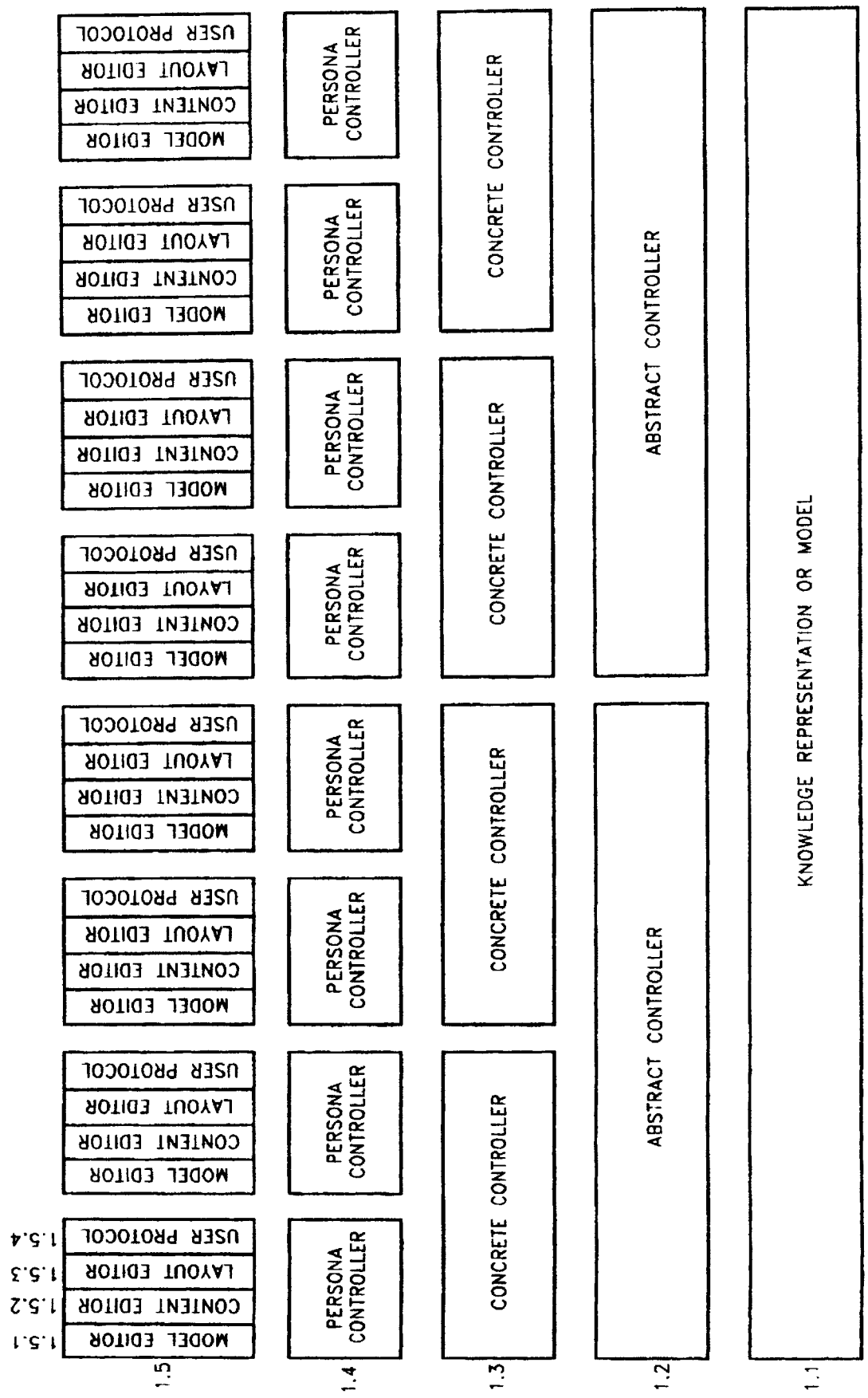
FIG. 1 provides a schematic illustration of the components of the subject CAM system.

Central to the present invention is the manner in which the knowledge representation, or the information within the catalog, is managed and maintained, along with the ability to have an extensible knowledge representation that grows to meet the needs of the information seeker. While the invention can be applied for provision of any information electronically, the ensuing description will focus on an electronic on-line catalog implementation. A product catalog knowledge representation is a collection of information about the products and the interrelationships between the products within the catalog. Knowledge representations have traditionally been categorized into two types (see: *Logical Foundations of Artificial Intelligence*, Michael R. Genesereth and Nils J. Nilsson, Morgan Kaufman Publishers (Los Altos, Calif., 1987)), including the procedural and the declarative knowledge representation. A procedural knowledge representation is one in which the knowledge is embedded within the application that utilizes that knowledge. For example, a program that calculates logarithms normally expresses its knowledge of how to calculate a logarithm as computer or programming language instructions directly within the program. A declarative knowledge representation is one in which the knowledge is represented independent of the programs that utilize the information. For example, a human resources database within a large corporation contains employee information which may be utilized by many different types of applications, such that the specific information or knowledge about the employees should be stored in a form which is neutral with respect to the applications which may utilize the information.

The Interaction Metaphor

It is the declarative knowledge representation which is required for the interacting metaphor, specifically the catalog agent metaphor (CAM) system of the presently-detailed embodiment of the invention. The CAM is defined as a set of software components, which ensures that a particular set of interactions with data stored in the knowledge representation can occur. The CAM consists of different software components which are involved in the entire flow of information from the entry and creation of the product model (via a Model Editor and content Editor) within the electronic catalog to its presentation to the end user while interacting with the catalog (via a User Protocol). It does this in a manner that keeps a consistent set of application semantics between the model creation, content entry, layout design, and user browsing, while at the same time utilizing a flexible underlying representation that can be extended in the future to support additional interaction techniques, new information, and new user types and roles. Each particular set of interactions with the catalog puts requirements on the information that the catalog's knowledge representation must capture in order for a particular type of exploration to take place. The CAM architecture facilitates the ability to add new interaction techniques to an electronic catalog and to reuse the information which exists within the catalog.

A schematic architectural representation of a plurality of CAMs and CAM-based catalogs is provided in FIG. 1. The sub-components which make up a CAM (starting with such traditional software components as an OLE*, ActiveX*, OpenDoc*, or Netscape*[1] extension control, separate independent programs, or a set of related routines directly embedded within a larger application), include the Knowledge Representation engine, controller, editors, and the User Protocol, all detailed further below. It will be apparent through the ensuing description of the functionality of each of the illustrated components that the components could stand alone or could be seamlessly integrated into one of a series of components or sub-components. Furthermore, the illustrated layers (e.g., the programmable logic of the illustrated controllers) could be "collapsed" upon each other, provided that the common behaviors were hard-coded into the system.

[1] *Denotes that each is a trademark of its respective owner.

The Knowledge Representation

The knowledge representation engine or model, 1.1 of FIG. 1, is a software system that stores and manages the data or information that is used by the system. Its implementation may be based on, but is not limited to, a traditional relational or object-oriented database system or as a frame-based semantic knowledge representation system. The model understands and manages the system based on a set of primitive fundamental constructs. These constructs are similar to those used in object-oriented analysis and design systems and consist of concepts (i.e., objects), properties (i.e., attributes or members), and associations (i.e., relationships), and constraints on those fundamental constructs and their definitions. The knowledge representation engine creates fundamental data objects and data structures and manages the consistency, completeness, and correctness of this information at a domain-independent knowledge engineer level.

The information in the knowledge representation will be used and re-used by the plurality of CAMs in the system, as distinguished from prior art systems in which single interactions each required a unique and dedicated set of information. In addition to the core information in the knowledge representation, the system allows additional semantics and structure, or constructs (a so-called "knowledge model") to be added to the knowledge representation in an iterative fashion. The contents, semantics, and structure of the knowledge representation are all extensible dynamically. This allows the information to be made more self-descriptive, and to allow the system to "reason" about the information without actual explicit knowledge of the information itself. A rich knowledge representation is preferable to store information about the products within the catalog. Utilizing a rich, expressive knowledge representation allows the catalog provider to start with simple information and knowledge models, for providing simple catalogs. The catalog provider can then iteratively build richer and richer information models that support progressively more complex inferencing and interaction with information through stepwise refinement and enhancement of the knowledge representation.

A wide variety of information can be collected about a product and the relationship between products within a catalog knowledge representation. In the simplest case, product information such as the name, a text description of the product, and the price can be captured. However, for supporting more sophisticated interactions, additional product and merchandising information can be captured and incorporated into the catalog knowledge representation including associations between products within the catalog, questions commonly handled by salespersons, product attributes, and categorization information. The information can be divided into two types: first, application (or usage) knowledge, relating to the application or applied use to which a catalog user will put the product (e.g., the user wants a camera for taking action shots), and second, definitional knowledge, which is knowledge capturing the specifications and properties that define the products (e.g., a camera has a particular weight, film size, focussing system, etc.). The sophistication of the interaction CAM will influence the amount and type of requirements placed on the knowledge representation. A simple product list interaction (e.g., "Display a list of all products in the catalog, along with a description and the price for each.") CAM will only require a catalog knowledge representation containing a list of names, part numbers and prices for products in the catalog. Any additional information which may be available within the knowledge representation about those listed products and their interrelationships would not be utilized. At the other extreme, for example, for a CAM to support a user's desire to gather all pertinent information for building a stereo system, a more complex knowledge representation will ideally provide information regarding interconnectivity between available stereo components, the number of components that a receiver will support, wattage, etc. The more complex CAMs add additional details and constructs to the knowledge representation. However, the original information is not changed and the original CAM processing is not impacted by the change.

In traditional systems, the user chose between the two extremes because the application was fixed to the underlying constructs and semantics of the knowledge representation, and because the knowledge representation was generally designed specifically to support the needs of a particular set of applications. In the inventive system, portions of the knowledge representation are segmented based on different design patterns and application-specific information and semantics. The information for a simple product list would constitute one or more segments of information, stored within the knowledge representation, which are fundamental to all products. The more complex catalog configuration example needs much of the same information, but also needs extended information not required by the simpler set of interactions. The inventive system provides a means for adding the additional information into the knowledge representation dynamically to support the extensions needed by the more complex applications/interactions. Further, the system allows the seamless movement between the different interaction metaphors by utilizing pivot points in the different segments of the knowledge representation. In general, it can be said that all CAM's are tied together across pivotal points in the single knowledge representation. Pivotal points are generally definitional details about the products, categories, or other fundamental concepts or objects represented in the knowledge representation which are invariant, which will be common across different CAMs, and which will provide overlap or "access" from one CAM to another during use of the system. Seamless movement of the user between CAMs is effected across knowledge representation pivotal points.

As a concrete example, consider two metaphors, or different views, into an electronic catalog. The first is a metaphor that allows the user to shop by walking through a set of categories, such as "clothing" which leads to "pants" and "shirts." Eventually, this category searchings leads the user to products of the type described by the category in which they are contained. The category is an orthogonal view into the knowledge representation for products. The information about categories is not needed or required to describe products in a well-designed knowledge representation. Instead, the semantics and information about the categories within the system can be maintained in a name space or segment of the knowledge representation separate from the information about the products. The only information that a category needs to know about a product is a unique identifier or key into the information model for the product. The objects or concepts that represent the category-to-product relationships within the system become pivotal points by which one can switch between two interaction metaphors within the catalog.

A CAM segments the information in the knowledge representation. At the knowledge representation level, this can be done in a variety of ways using the natural constructs of the knowledge representation. These methods include grouping based on the following: common associations, aggregations, or inheritances; name managing, qualifiers or name spaces for object group identification; or, usage of specific semantic symbols that only have meaning to a particular metaphor and are known by that metaphor. The foregoing provides a means for the category abstract controller (discussed below) to determine what objects or concepts in the knowledge representation are categories. Further, there may be two or more concrete category controllers for a particular abstract controller (to be detailed below). Each of these concrete controllers may be concerned with a different set of properties or attributes of the categories. Each concrete controller must have a means for retrieving and managing only those properties that are of interest to that particular concrete controller.

As in all marketing modeling applications, in order to define the requirements for the knowledge representation to be used, one must look to the following: the type of anticipated users, the level of sophistication of the anticipated users, the set of desirable activities that users might expect to perform when using the catalog, the knowledge required by the user in order to interact with the catalog, and the knowledge required for the catalog to interact with the user. As will be further detailed below, the CAMs not only operate to retrieve information from the knowledge representation, but also operate to display, or present, the information in a manner that is reflective of the profile of the user. Therefore, layout information will be accessed through portions of the knowledge representation, as will user profile information for instantaneous and historical usage. While the knowledge representation is referred to in this description as a single logical knowledge representation, it may in fact consist of several independent databases or knowledge storage systems. For example, layout may be stored in initialization files or resource files of the knowledge representation, independent of the application or definitional product knowledge. In the alternative, another database system or knowledge representation may be used for gathering and storing display or presentation-oriented information of users with the system (i.e., information about user interactions).

Despite the fact that the knowledge representation may physically be more than a single unit, the CAM provides the user with a single logical view of the knowledge representation. Further, the knowledge representation may take on different forms depending upon what activities are being performed on the knowledge representation. For example, the content and model editing may be done in a frame-based-type knowledge representation allowing more flexible modeling, while the controller may work on a form of the knowledge representation that is generated as a relational database system. The controller and editors will now be discussed in greater detail with reference to the CAM's.

The Controllers

The inventive system includes at least one controller (i.e., programmable logic) for implementing the interaction of the metaphors with information stored in the knowledge representation. As further detailed herein, the at least one controller must provide a variety of functionalities for handling the interactions. Therefore, while one controller could be utilized, it is functionally more explicit to describe the system as including a plurality of controllers, each programmed to one or more of the detailed functions. The functional set of controllers, including those illustrated in FIG. 1 as the Abstract Controller, 1.2, the Concrete controller, 1.3, and the Persona Controller, 1.4, manage the access and modifications to the knowledge model or knowledge representation engine. The controllers may interface or extend the knowledge engine, by utilizing a wide variety of techniques such as object inheritance and extension, local or distributed API function calls, or method invocations. Each controller enforces and adds additional semantics and language to the core model provided by the knowledge representation engine. Each level of controller builds on the previous level, adding more and more domain-specific semantics and constraints to the system.

Each CAM controller is responsible for the creation and maintenance of a small subset of the potentially complex knowledge representation. The CAM is only aware at each level of how to manage the portions of the model that are necessary for its particular set of interaction techniques and the semantics and information required to support that interaction technique. Further, each CAM knows what information is necessary within the knowledge representation for it to exist or function. For example, a categorization searching interaction technique would have a categorization CAM controller that understood how to manage objects or data structures that represented categories within the system. In addition, the categorization CAM controller would understand the relationships between multiple categories as well as the relationships between products and categories. This categorization CAM controller might not actually be responsible for the creation and maintenance of the actual product information, but would provide support for managing and creating relatively small and simple portions of the overall knowledge representation. A series of CAM controllers can be built up to form a complex knowledge representation management system.

The Abstract Controller

Figure 2A:
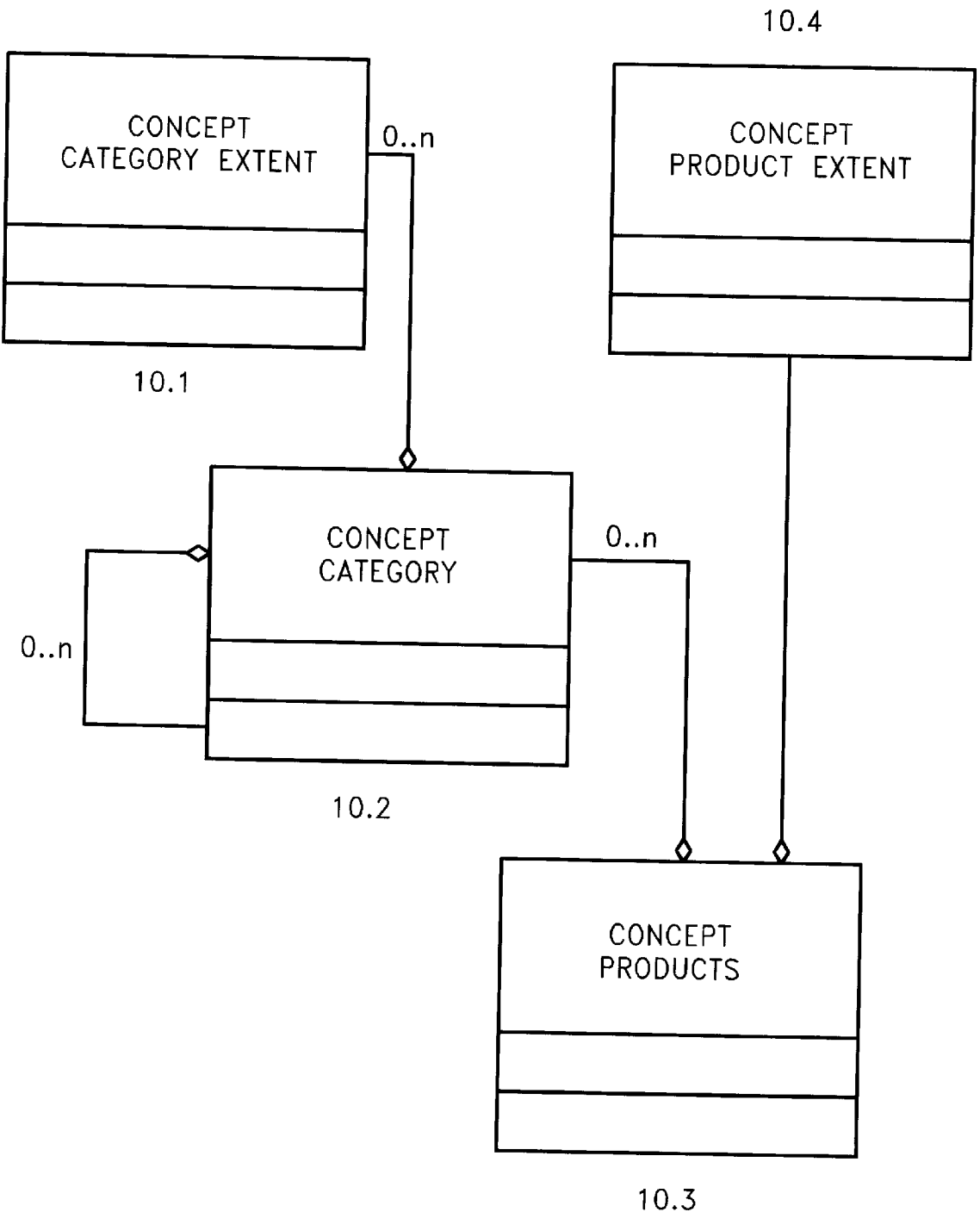
FIGS. 2a and 2b illustrate representative simple category hierarchies in accordance with the present invention.

An Abstract Controller can cluster the building of the knowledge representation for related CAMs, when the same information is needed by each, but the information will be accessed and rendered from different views. The Abstract Controller, 1.2 of FIG. 1, is responsible for implementing a set of abstract design patterns. A design pattern is a reusable pattern of objects or concepts within a system and the interaction of those objects or concepts. At the Abstract Controller level, these design patterns are generic patterns with a particular domain. The Abstract Controller is domain-specific but application-independent. For example, most catalogs have a concept of objects called categories. A category is a fundamental object within the catalog that has a relationship with other categories (called super categories or subcategories) and with other objects (called products). FIG. 2a depicts a model that could represent this category/navigation catalog design pattern. The concept "Category Root", 2.1, has at least one "Category", 2.2, concept associated with it, which in turn has one or more "Product" concepts, 2.3 associated with it. The Abstract Controller adds additional semantics and constraints on the basic model or knowledge representation maintained by the knowledge representation engine. Items in the knowledge representation are managed as objects and concepts but have no richer semantics associated therewith. The Abstract Controller adds the terminology and semantics for the user of the system. In addition to the additional structure and semantics added to the model, the Abstract Controller also provides the interface for querying and manipulating the objects that are part of the design pattern within the knowledge representation.

The inventive CAM system provides a set of base CAM Abstract Controllers from which a wide variety of user interactions and content management tasks can be performed for the generic product catalog domain. CAM Abstract Controllers may exist for the management of products, stock-keeping units, categorization or navigation within a catalog, key word searching within a catalog, question and answer sessions with a catalog, parametric attribute/value searches, associations of products (e.g., accessorization, up-selling, and requisite component matching), and packaging and bundling of products.

The Concrete Controllers

Figure 2B:
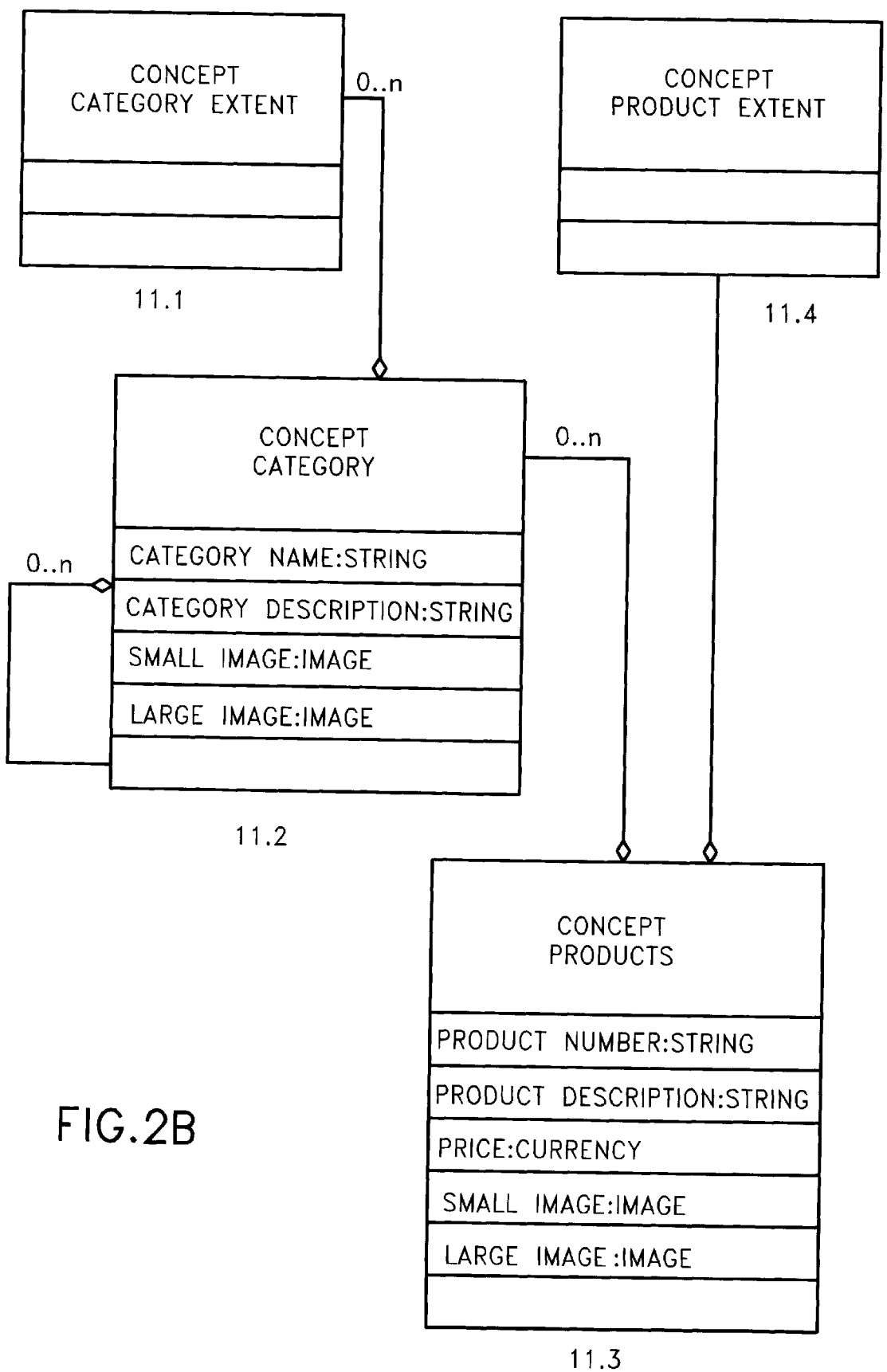

Concrete Controllers in the present inventive system build on design patterns provided by the Abstract Controllers. A Concrete Controller adds application-specific information into the knowledge representation and manages that information. For example, as depicted in FIG. 2b, particular attributes are added to the objects which were defined by the Abstract Controller. While the general concept of the category design pattern may be generic across many product categories, and across many catalogs, the specific attributes which are stored and managed differ. A single Abstract Controller may support one or more Concrete Controllers. Further, it is possible that a system may not actually implement Abstract Controllers, but would instead create a Concrete Controller that directly interfaces with the knowledge representation engine.

The Concrete Controller can add additional semantics and restrictions on the creation and management of the knowledge representation to support application-specific (or provider-specific) semantics, such as a requirement that one catalog provider will allow products to exist anywhere within their categorization model, while another provider will require that the products exist only on leaf categories. The Concrete Controller may also utilize additional concepts within the knowledge representation beyond those that are specified by the Abstract Controller.

The Persona Controller

The Persona Controller, 1.4, is an extension of the Concrete Controller that is user-specific or session-specific. It extends the application domain of the Concrete Controller with particular search and management features that are specific to a particular user interaction or type of session. For example, the underlying knowledge representation could store values and attribute names for a property on a concept in English, Spanish and Japanese forms. The Persona Controller understands the context of the current session with an user (from information gathered by the User Protocol, as further discussed below, or from information stored from previous sessions) and manages information at a session or context level. Therefore, given the context of the current session, the Persona Controller may dictate that information retrieved be presented in Spanish. Another example of a Persona Controller dictate may be that only information in the knowledge representation relating to winter clothing will be retrieved if the user making the request lives in Antarctica.

The Editors

The views or editors, 1.5, are the tools that users or other software systems interacting with the system utilize in order to access or modify the information stored in the knowledge representation. There can be a multitude of different viewers or editors that can work with the knowledge representation and with the various levels of controllers. The need for different editors and views is based on the different entities which must interact with the system. Some entities, or users, are responsible for the management and updating of content within the catalog, while others are interested in the viewing or querying of information within the catalog. In addition, the person or entity responsible for managing the data model or for modeling information within the system is likely to be different from the person or entity responsible for actual data entry. The different editors and views provide a means for specializing the interaction of the catalog to the roles and responsibilities and skill levels of the entity interacting with the catalog. Four discrete types of editors are currently envisioned for the inventive system: the Model Editors, the Content Editors, the Template/Layout Editors, and the User Protocols.

The Model Editors

The CAM iteratively allows the creator of the information within the catalogs knowledge representation to build up the model and contents within the catalog. In general, the process begins with the Model Editor adding into the knowledge base the various properties of the model needed to support the CAM Controller's ability to access information within the knowledge representation. The Model Editor may add generic categories, property names, or constraints into the knowledge representation in order to support a particular interaction with the catalog. The process of creating the model with the Model Editor may or may not occur independently of the process of adding actual content (via the Content Editor, discussed below). Depending upon the relationship of the content in the categories, it may be unrealistic to separate out the modeling and the content provision. For example, if the content is categorization into "is-a" type relationships, the content of the categories and the model itself will likely be interrelated at their creation. In the pure case wherein the model and the contents are input independently, content or values are added to the knowledge base to fill in the properties, constraints, and categories that are required to implement the interaction techniques supported by the metaphor.

Figures 3, 4:
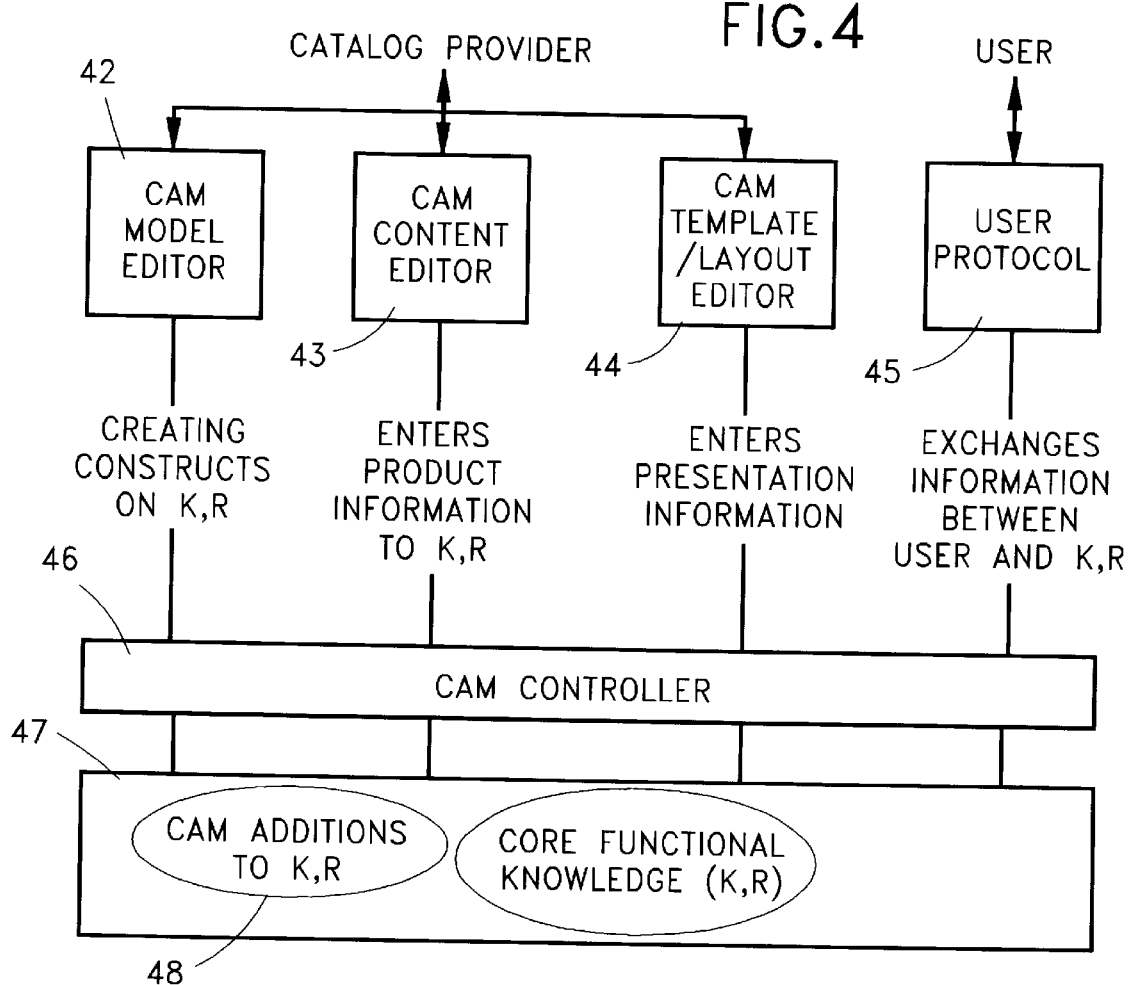
FIG. 3 illustrates a sample data structure which could be created by the CAM Model Editor to hold product information.
FIG. 4 provides a diagram illustrating the activities and flow of the CAM components.

The CAM Model Editor is a tool for the creation of the knowledge model within the knowledge representation engine. The Model Editor creates or enhances the knowledge representation model with additional semantics, categories, properties, relationships, attributes and other constructs that may be required to support the interaction of and with the CAM. A new CAM may be able to utilize an existing knowledge representation model without the addition of further modeling constructs. However, it is generally assumed that there will be additional requirements not otherwise contemplated when the knowledge representation was established, such as become apparent when the catalog provider identifies the products, the anticipated users, the expected user interactions, etc. The CAM Model Editor is not a general model editor designed to allow arbitrary models to be created within the knowledge representation. Rather it is available to support the creation of a particular set of closely-related interaction techniques based upon the type of information already existing in the knowledge representation. The CAM Model Editor simplifies and constrains the modeling activities that the user of the CAM must perform in order to successfully interact with the knowledge representation. FIG. 3 illustrates a sample data structure which could be created by the CAM Model Editor to hold product information.

The CAM Model Editor, therefore, views the knowledge representation only through the controllers with which it interfaces. For example, a CAM Model Editor that interacts with a Concrete Controller might understand only how to create data objects for categories and how to interrelate those category objects with products and categories. If other types of objects or concepts exist in the system, such as objects that represent pricing, the category Model Editor will not be aware of them. Further, the category CAM manager/controller may have access to all the information about products since it is generally designed only to associate products and categories, but not to manage the detailed information about products. The Model Editor associated with the category CAM manager/controller provides a means for adding to the knowledge representation about the categories. The changes made by the Model Editor may be made directly to the knowledge representation or, alternatively, to a meta-model that describes the structure of the information within the knowledge representation. This meta-model is then read by the concrete controller, which uses it as a template for creating new instances of the different concepts or objects within the knowledge representation and for enforcing the stricture that all objects currently in the knowledge representation meet the specifications set forth by the meta-model. The later approach provides a more flexible means of managing information within the meta-model.

The Model Editors are also responsible for setting or creating policies that are utilized by the CAMs. For example, a policy might exist within an organization (i.e., the catalog provider) that only leaf categories can have products. The CAM Model Editor allows the user to specify and set up the policies that will be utilized for their particular organization. The Model Editor is designed to enhance the data structure and the relationships between information. Logically speaking, the Model Editor does not add the raw data or content to the system.

The Content Editor

The CAM Content Editor is used for the actual entry of information into the model constructs created by the CAM Model Editor within the catalog knowledge representation. With reference to FIG. 3, the CAM Content Editor would be the tool for filling in the chart or data structure created by the CAM Model Editor. The Content Editor allows manual entry of data into the model or bulk import of information through some interchange format or schema mapping and migration (e.g., via usage of prior art graphics tools, animation tools, etc). It is even possible that the content may not be explicitly entered into the knowledge representation, but only logically stored there through a logical view created by the CAM Content Editor in the knowledge representation.

A product expert or other representative of the catalog provider will use the CAM Content Editors. Two types of anticipated interactions would motivate entry of information into the knowledge representation via the CAM Content Editor. A knowledge expert, in the role of a technical advisor, will enter definitional knowledge about the product, such as model number, weight, etc. (i.e., technical and product specification information). The same person or a different catalog provider representative, in the role of a salesperson or sales advisor, will enter application knowledge, such as the type of information which would be relevant to a salesperson (i.e., customer query and answer interaction information).

The Template/Layout Editor

The CAM Template/Layout Editor allows customization of the behavior and layout of the CAM for rendering of a presentation to the user. The purpose of the Template Editor is to separate the behavior of the CAM, as coordinated by the controller, from the layout or appearance of the CAM. The Template/Layout Editor will typically be utilized by a graphics designer or merchandising expert for the catalog provider. Storage of the layout information will optimally be in a meta knowledge representation specific to the presentation. As with the other editors, the Template/Layout Editor may be implemented as a stand-alone component or integrated with the other CAM editors. As noted above, the Template/Layout Editor is an optional, rather than an integral, component of the CAM. The Template/Layout Editor is responsible for managing the information's presentation aspects for the catalog user. This is does by providing templates of how information is to be presented when accessed and specifying different formatting information on the data elements within the knowledge representation.

The User Protocol

The CAM User Protocol comprises the portion of the CAM which is responsible for rendering the metaphor for interaction with users or with other applications (i.e., non-human users). Depending upon the particular CAM, the rendering may be an interaction or, simply, static publishing. In static publishing, the User Protocol will publish out all or a portion of the catalog. A dynamic User Protocol, for use with a web browser, kiosk or CD-ROM media environment, will coordinate or conduct an interaction between the user and the catalog. The User Protocol gathers information regarding the catalog user (e.g., applying a Baysian formula for gradations of preference), which information is stored and utilized by the Persona Controller.

It is to be noted that the Persona Controller not only interfaces with the User Protocol for end user interactions, but also interfaces with the graphics artist user of the Template/Layout Editor, the data entry user of the Content Editor, and the Technical Advisor/contract engineer user of the Model Editor. In each instance, the Persona Controller can customize the system behavior (or interaction) to the "user-appropriate" level. The logic in the Persona Controller will change the system interaction behavior based on user-specific information (either concurrently input or previously stored) or statistical groupings of demographics relating to the user input information.

As noted above in the background section, different users may require presentation of information in different languages and/or different formats, and may, in fact, require presentation of different information from the knowledge representation. It is the job of the User Protocol to gather specific information about the user and the job of the Persona Controller to tell the CAM Controller how to present information retrieved from the knowledge representation based on the gathered user-specific input. Further, the information gathered by the User Protocol may be selectively stored by the system for use not only in presenting information to the user during the current interaction, but also for future interactions. In addition, multiple user interaction information can be maintained by the system to provide demographics data to direct future cataloging and interaction efforts.

FIG. 4 provides a diagram illustrating the activities and flow of the CAM components. The CAM Model Editor at 42, CAM Content Editor at 43, and the CAM Template/Layout Editor at 44 represent creation components for the catalog provider to utilize when creating and/or updating the knowledge representation. The Protocol, at 45 to the right of the Figure, depicts the runtime CAM component with which the user interacts when utilizing the CAM system. Each component's role is briefly indicated along the line between the component and the CAM Controller, 46, with which it interacts. Therefore, as indicated, the CAM Model Editor creates in the knowledge representation modeling constructs required by the CAM; the Content Editor enters pointers to or actual product definitional knowledge or other application/usage specific information into the knowledge representation for the CAM; the Template/Layout Editor enters presentation or layout information into the knowledge representation, or associated metafile, as will be required for customization of the CAM; and, the User Protocol in conjunction with the Persona Controller exchanges information with the knowledge representation in order to provide interaction with the user and/or to publish a view of the catalog. The knowledge representation, as depicted at 47 of the Figure, includes the core functional knowledge at 48, along with the additional CAM application knowledge, which will have been added by the Editors to facilitate the operation of the CAM.

Figure 5A:
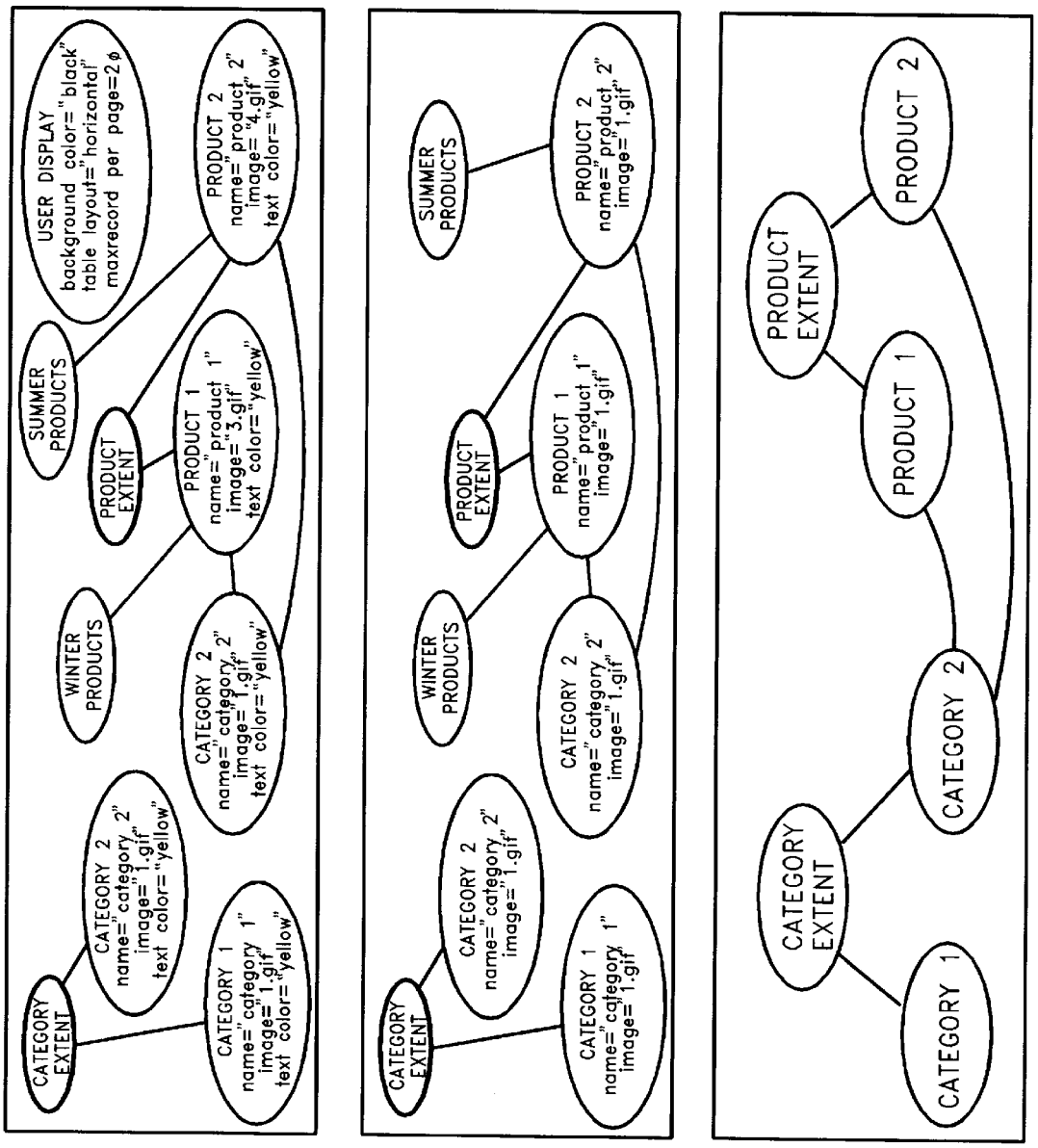
FIG. 5 depicts the relationship between the different Controllers, knowledge representation engine, and Editors in terms of their logical view of the knowledge representation.
Figure 5B:
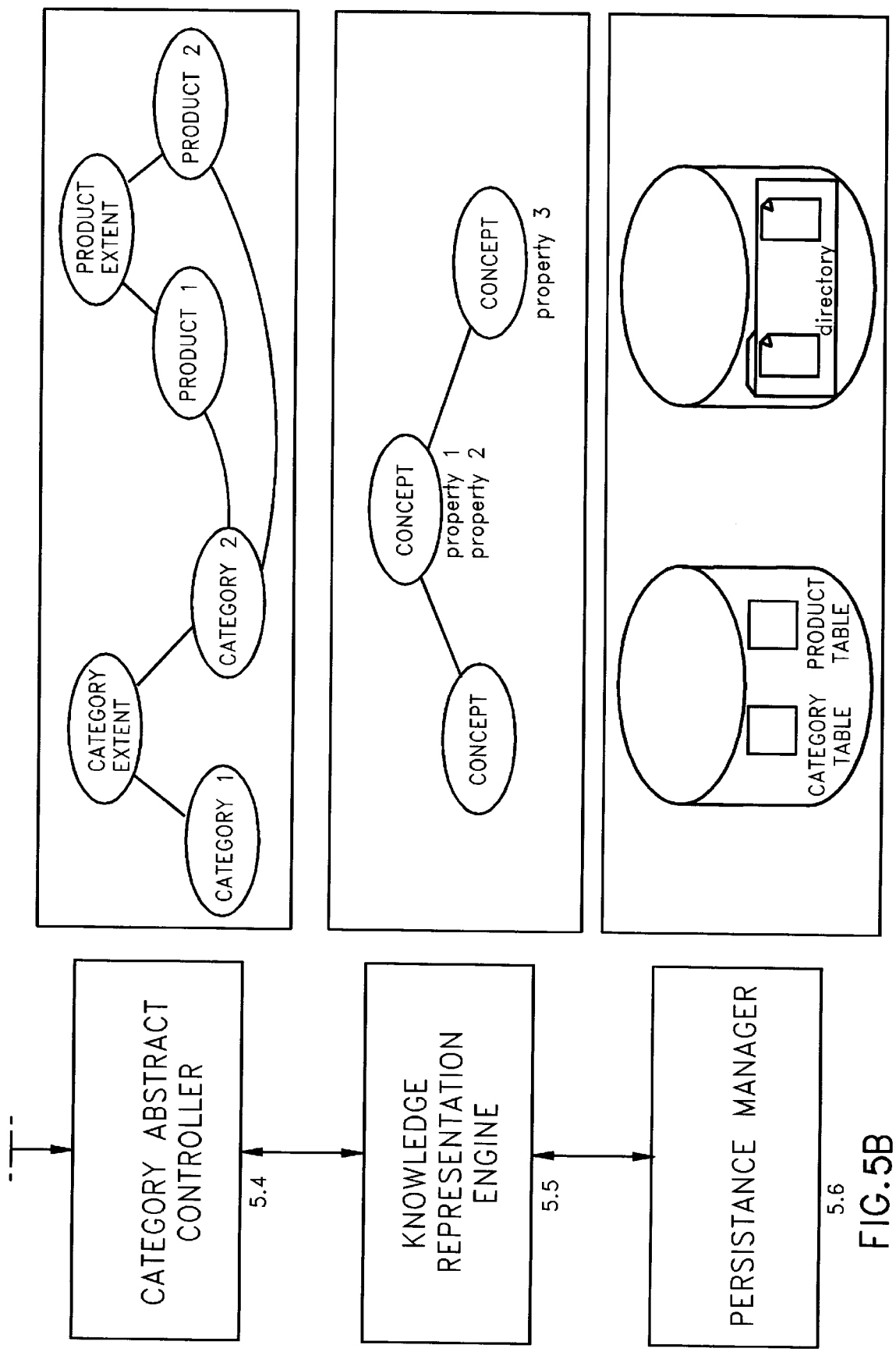

FIG. 5 depicts the relationship between the different Controllers, knowledge representation engine, and Editors in terms of their logical view of the knowledge representation. Item 5.6 depicts the underlying persistence management software system. The persistence of the data structures and fundamental information storage of the system can utilize a wide variety of technologies, including, but not limited to, object-oriented DBMS, relational or files within an operating system file structure. At this level, the knowledge representation is logically and physically stored based on a mapping into the mechanism used by the persistence manager.

Item 5.5 represents the knowledge representation engine software system. In the inventive system, the knowledge representation engine stores and manages information as generic knowledge modeling and management objects. The engine manages the information utilizing a set of fundamental domain-independent semantics as are common in a variety of frame-based knowledge representation systems, or as described in object-oriented or relational information management and modeling systems. These fundamental modeling objects are stored and retrieved utilizing the facilities of the persistence management system.

Item 5.4 represents the Abstract controller software system. The Abstract Controller software system adds the semantics of the generic domain such as catalog management or parametric product attribute management. The fundamental concepts or objects are managed through request and storage via the knowledge representation engine, 5.5. The category Abstract Controller manages and retrieves the information from the knowledge representation engine utilizing additional semantics, whereas the knowledge representation engine sees these objects as only fundamental objects without the additional semantics.

Item 5.3 is the Concrete Controller software system. The Concrete Controller software system adds additional semantics to the category Abstract Controller semantics that are specific to a particular application that is utilizing the underlying categories. For example, the particular application illustrated in 12.9 has particular properties or attributes "Name" and "Image" that it manages on every category in the system. The Concrete Controller both enforces and manages the information with these additional semantics. The information about the application-specific semantics may or may not be embedded in the programmatic logic of the Concrete Controller software system. These application domain semantics and constructs may be described in a meta-model also stored within the knowledge representation, or an associated location, to allow the Concrete Controller to quickly adapt to changes in the system or to support additional application-specific domains. The Concrete Controller manages information by passing requests through the Abstract Controller.

Item 5.2 represents the Persona Controller software system. The Persona Controller again adds additional semantics to the semantics of the Concrete Controller and the Abstract Controller. The Persona Controller is designed to support session level or catalog user-specific information. In the example shown in 5.8, products are categorized by "Winter Products" and "Summer Products". The Persona Controller understands the additional semantics that these two concepts add to the system. When a user retrieves products during the summer, or from a geographical location which is tropical, the Persona Controller only requests products from the knowledge representation that are subsumed by the category "Summer Products". Conversely when a user retrieves products during the winter, the Persona Controller only requests products subsumed by the category "Winter Products". The Persona Controller sees the knowledge representation and makes requests to the knowledge representation utilizing the underlying Concrete and Abstract Controllers, if present.

An Editor or View is represented by item 5.1. The particular example shown in FIG. 5 depicts the Template-Layout editor. The Template/Layout Editor specifies additional layout or presentational semantics and attributes onto the information represented within the knowledge representation. In the example, 5.7 shows an additional concept called "user display" that is managed by the Template/Layout Editor. Further, the attribute "Text Color" has been added to the category and product concepts within the system. These additional attributes and their values are added into the knowledge representation to support the semantics of layout/display that the user specifies through the Template/Layout Editor.

The system managing the knowledge representation has both a horizontal and vertical stack. The vertical stack manages the information in the knowledge representation in an application/domain neutral manner at the bottom and in progressively more application-specific and domain-specific manner through the different layers of controllers. The horizontal management is done through the views/editors which split the management of the information within the roles and functions of the users of the system.

FIG. 6 provides a schematic illustration of multiple CAM's interacting with the CAM Controller and, through the CAM Controller, with the knowledge representation. In user operation or interaction with the system, each CAM, 61, 62 and 63, may represent a different view of information provided in the knowledge representation. For example, CAM 61 may provide a Sales Assistant functionality, whereby user and the system are engaged in a query:response interaction regarding the attributes of a product or category of products. CAM 62 may provide the Product Explorer functionality whereby user can tell the system what product features are most important to them, with the system then directing user to products or categories of products based upon that exchange. CAM 63 may provide a Product Comparator functionality, whereby the system provides a side-by-side comparison of specific products for viewing by user3. Each different CAM thereby provides a different type of interaction between the user and the controller in order to present information from the knowledge representation, which is appropriate to the user's needs. As noted above, pivotal points in the different views of the knowledge representation will overlap into different CAM's, and will operate as seamless transition points for moving from one CAM to another during user interaction with the system, such that user1 may move from the Sales Assistant CAM into the Product Comparator CAM once his/her initial questions are answered through the first interaction.

Figure 7:
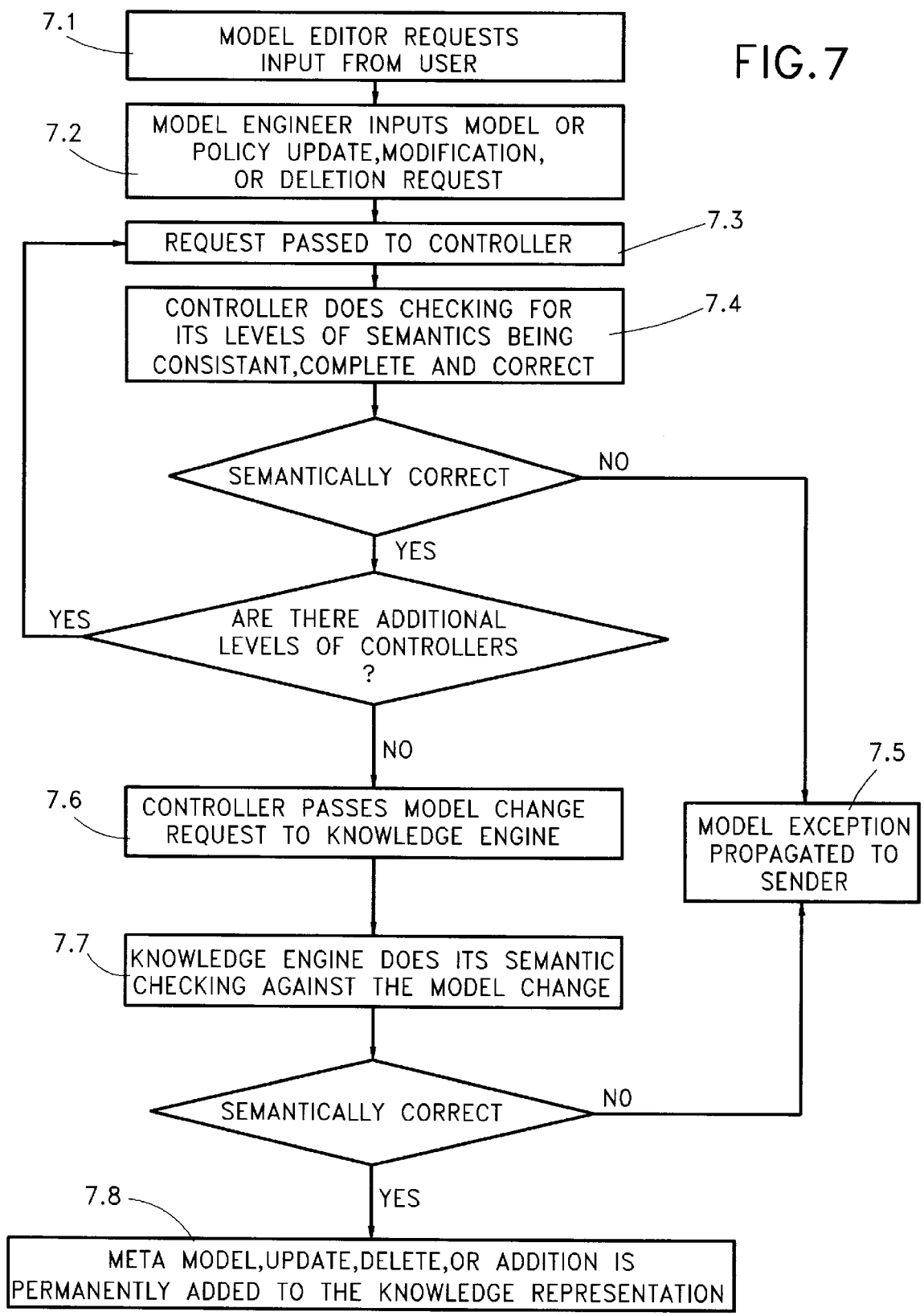
FIG. 7 illustrates a representative process flow for a Model Editor interacting with the knowledge representation.

A brief example of the creation of CAMs for providing camera catalog information and of a user's interaction with the created CAMs for obtaining product information about cameras follows. Assuming that the knowledge base is initially void of any knowledge (either model constructs or content), the process for creating the knowledge for the CAM begins by implementing the Model Editor. The Model Editor prompts the representative of the catalog provider to input the types of products and their attributes to be used for creating the model. The Model Editor will determine whether each of the input attributes falls into the category of definitional or application/usage knowledge, and will create customized data structures to include the input information. FIG. 7 illustrates a representative process flow for a Model Editor interacting with the knowledge representation. Similar process flows are utilized by each of the Editors when invoked.

At step 7.1, the Editor requests input from the user, which would probably be a catalog provider representative who is a programmer or model engineer in the case of the Model Editor. The provider representative inputs model or policy updates, modifications, or deletion requests at 7.2. The request is passed to the Controller level at 7.3 and the Controller level checks that the semantics are consistent, complete and correct, at step 7.4. If semantically incorrect, a model exception is propagated to the sender/provider representative at step 7.5. If semantically correct, the system will repeat the checking process for additional levels of Controllers, if necessary (depending upon the system architecture). Once it has been determined at all Controller levels that the request is semantically correct, the controller passes the model change request to the knowledge representation engine at step 7.6. The knowledge representation engine does additional checking of semantics against the model change at 7.7. Once again, if the semantics are not correct, an exception is raised and returned to the sender/provider. If, however, the knowledge representation engine determines that the request is semantically correct, the meta-model, update, deletion or addition is permanently provided at the knowledge representation.

A resulting representative knowledge model created with the Model Editor for "point and shoot" cameras is shown in FIG. 8. The model indicates that point and shoot cameras have two ancillary, or application dependent attributes (part number and price) and have three definitional attributes (including weight, zoom magnification and focus type). Another step involves using the Content Editor to enter data values into the model created by the Model Editor. The Content Editor may appear to the catalog provider representative as a series of dialogs, a spreadsheet, or other logical format through which data may be entered. FIG. 9 provides a resulting knowledge model created with the Content Editor for point and shoot cameras. Attributes defined in the Model Editor have been assigned values for each of the two cameras. At this point, there is a model on which the CAM Controller can operate and with which the user can interact.

It may additionally be desirable, at this juncture or at any other time, to specify some presentation information about how the information will be presented to the user. The optional Template/Layout Editor can be invoked to add information into the knowledge model about how the information should be presented. Further, question and answer sets may be provided in the knowledge model in order to provide the functionality of an on-line salesperson's interaction with the user (i.e., the Sales Assistant functionality). The Content Editor is the vehicle for entry of such information into the knowledge model. In addition to the anticipated queries and responses, the responses will be correlated to product attributes/constraints as appropriate.

Figure 10A:
FIGS. 10a and 10b illustrate representative views of product selection screens in tabular format.
Figure 10B:

With a model on which the CAM Controller can operate, the system is ready for a user interaction. Clearly it may be desirable to further expand the catalog to include other point and shoot cameras, other cameras, and other unrelated products and product attributes. One of the advantages of the present system is that the system can be operational with a basic level of knowledge, and can continue to be operational while any quantity of additional knowledge is added. Assuming availability of the model depicted in FIG. 9, an internet user may access the User Protocol implemented as a CGI script. The CGI script would talk to the CAM Controller to get a list of products and their attributes and ask the user to choose a particular attribute value that it wants a camera to exhibit. FIG. 10a illustrates a representative view of a product selection screen in tabular format. If the user interacts with the system by deciding that they want the highest zoom value as their most important criteria, the user would be presented with the incremental recalculation of the relevant set of remaining products and their attributes as depicted in FIG. 10b. Note that the system has removed the choices of 16 oz. cameras, 24 oz. cameras, and cameras having AutoFocus with Manual override, since no available camera in the catalog satisfies the criteria of having a 3× zoom along with the desired properties.

The user may at any point wish to interact with the system in a query:response mode in order to further his or her product knowledge, or may wish to view any available products once the product set has been limited to a reasonable number of choices for display and comparison. The CAM system allows the user to switch between CAM's in order to interact with the system in the user's preferred mode. The representative icons shown in FIGS. 10a and 10b provide a point and click capability for the user to transition from one CAM to another without having to lose the benefit of the interaction to that point. As shown in FIG. 10a, therefore, the user may, at any time, click on the "Sales Assistant" icon in order to interact with the CAM designed to conduct a question and answer interaction. In the alternative, the user may click on the "Show Products" icon for display by the appropriate CAM of the 28 available products which meet the "desired properties" criteria (i.e., the aforementioned "Product Comparator" functionality), or may transition to the "Product Explorer" CAM to identify more or different product features for presentation.

Figure 11:
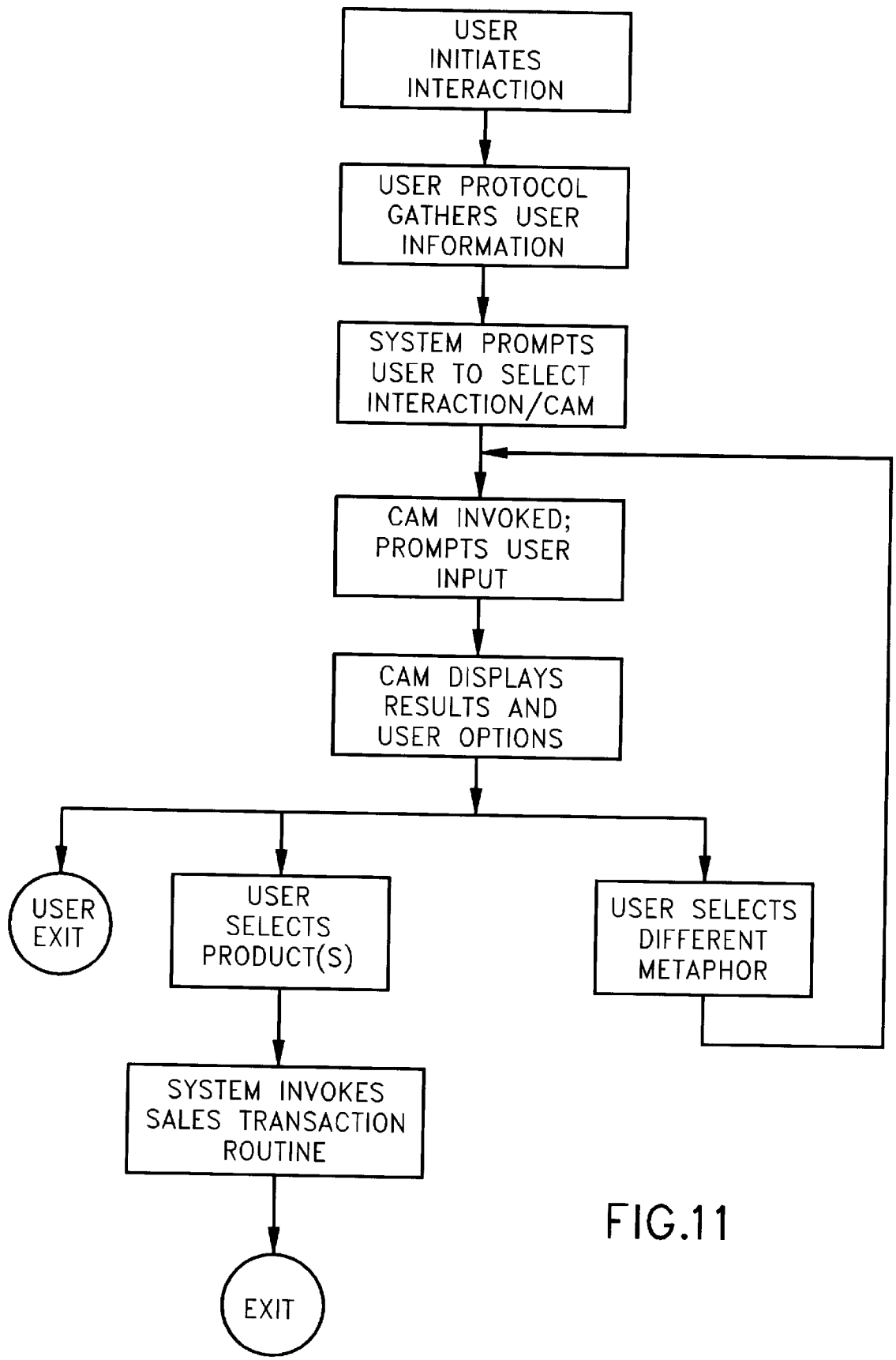
FIG. 11 provides a representative process flow for a user's interactions in accordance with the present invention.

FIG. 11 provides a sample process flow of a user interaction with the CAMs of the present invention. Upon user initiation of an interaction, the User Protocol first gathers user-specific information, by prompting the user and receiving input. The user-specific information may be a simple identifier for an established user of the system, or may be detailed responses to survey-style prompting by the User Protocol. After the user-specific information has been gathered, the system prompts the user to input, in general, the product information desired. Given the desired product information and the user-specific information, an appropriate CAM is invoked; it prompts the user along its interaction; and, it displays search results and user options in accordance with the progression of the interaction. At any time, the user may opt to engage in a different interaction, and will invoke a different CAM by clicking on a displayed icon or by returning to the "HOME" starting point and beginning anew. Once the user has reached a point at which they wish to terminate the interaction, the user has the option of invoking a Sales Transaction interaction for arranging for purchase of the selected item, or of exiting the program.

The invention, therefore, provides a system for creating and maintaining an on-line interactive catalog for user-customized presentation of catalog product information. Clearly the proposed system can also be utilized to create, maintain and interact as a system designed for information provision, without the merchandising aspect. While the present invention has been described with reference to several specific representative components, it will be clear to one having skill in the art that certain modifications to the invention can be undertaken without departing from the spirit and scope of the invention as defined in the appended claims.

Having thus described our invention, what we claim as new and desire to secure by Letters Patent is:

1. A computer system for providing interactive presentation of provider information between the system and a computer user comprising:
   - at least one extensible database for storing flexible representations of said provider information;
   - at least one system controller for selectively retrieving and presenting provider information from said at least one database to said user; and
   - a plurality of interaction metaphors, and wherein said selectively retrieving comprises selecting one of said plurality of interaction metaphors and executing said selected one of said plurality of interaction metaphors.

2. The computer system of claim 1 further comprising at least one editor means for manipulating said stored flexible representations of said provider information.

3. The computer system of claim 2 wherein said at least one editor means includes means for creating constructs comprising portions of said stored flexible representation of said provider information.

4. The computer system of claim 2 wherein said at least one editor means includes means for entering additional information into said at least one database.

5. The computer system of claim 4 wherein said means for entering additional information into said at least one database includes means for creating presentation information regarding presenting provider information to said user and for storing said presentation information with said provider information.

6. The computer system of claim 3 wherein said at least one editor means includes means for entering additional information into said at least one database.

7. The computer system of claim 6 wherein said means for entering additional information into said at least one database includes means for creating presentation information regarding presenting provider information to said user and for storing said presentation information with said provider information.

8. The computer system of claim 2 wherein said system further comprises protocol means for gathering user-specific information from said user.

9. The computer system of claim 8 further comprising persona controller means for receiving input from said protocol means, for creating a user presentation profile based on said input, and for communicating said user presentation profile to said at least one system controller.

10. The computer system of claim 8 wherein said selectively retrieving comprises selecting one of said plurality of interaction metaphors based on said user-specific input.

11. The computer system of claim 1 wherein said at least one database for storing flexible representations of said provider information comprises at least means for storing both definitional information and application information about said provider information.

12. The computer system of claim 1 further comprising at least one system component for creating and editing semantic information about said product information.

13. The system of claim 12 wherein said system further comprises protocol means for gathering user-specific information from said user.

14. The system of claim 12 wherein each of said plurality of subsystems further comprises at least one layout component for customizing presentation of said product information.

15. A method for providing an interactive presentation of provider information between the system and a computer user comprising:

storing a plurality of flexible representations of said provider information; and selectively retrieving and presenting provider information from said at least one database to said user wherein said selectively retrieving comprises selecting one of a plurality of interaction metaphors and executing said selected one of said plurality of interaction metaphors.

16. The method of claim 15 further comprising manipulating said stored flexible representations of said provider information.

17. The method of claim 16 said manipulating comprises creating constructs comprising portions of said stored flexible representation of said provider information.

18. The method of claim 16 wherein said manipulating comprises entering additional information into said at least one database.

19. The method of claim 18 wherein said entering additional information into said at least one database comprises creating presentation information regarding presenting provider information to said user and storing said presentation information with said provider information.

20. The method of claim 15 further comprising gathering user-specific information from said user.

21. The method of claim 20 further comprising creating a user presentation profile based on said input, and storing said user presentation profile.

22. The method of claim 21 further comprising retrieving said stored user presentation profile and applying said user presentation profile for presenting to said user.

23. The method of claim 15 wherein said storing flexible representations of said provider information comprises storing both definitional information and application information about said provider information.

24. The method of claim 15 further comprising adding provider information to said flexible representation.

25. The method of claim 15 wherein each of said plurality of representations includes presentation information associated with said provider information and wherein said presenting comprises accessing said presentation information associated with retrieved provider information and customizing the presenting of said retrieved information in accordance with said presentation information.

26. The method of claim 15 further comprising switching from said invoked interaction metaphor to another of said plurality of interaction metaphors in response to user input.

* * * * *